(12) United States Patent
Rexin et al.

(10) Patent No.: US 8,552,103 B2
(45) Date of Patent: *Oct. 8, 2013

(54) FILLED POLYAMIDE MOLDING MATERIALS SHOWING A REDUCED WATER ABSORPTION

(75) Inventors: Ornulf Rexin, Heidelberg (DE); Etienne Aepli, Domat/EMS (CH)

(73) Assignee: EMS-Chemie AG, Domat/EMS ( * ) Notice: Subject to any disclaimer, the term of this patent is extended or adjusted under 35 U.S.C. 154(b) by 107 days.

This patent is subject to a terminal disclaimer.

(21) Appl. No.: 12/914,143

(22) Filed: Oct. 28, 2010

(65) Prior Publication Data

US 2011/0039979 A1 Feb. 17, 2011

Related U.S. Application Data

(62) Division of application No. 12/027,581, filed on Feb. 7, 2008.

(30) Foreign Application Priority Data

Feb. 7, 2007 (EP) .................................. 07002642

(51) Int. Cl.
- *C08K 3/04* (2006.01)
- *C08K 3/10* (2006.01)
- *C08K 3/22* (2006.01)
- *C08K 3/34* (2006.01)
- *C08L 77/06* (2006.01)

(52) U.S. Cl.
USPC ............ 524/495; 524/442; 524/494; 524/602

(58) Field of Classification Search
USPC ................... 524/442, 494, 495, 602; 523/602
See application file for complete search history.

(56) References Cited

U.S. PATENT DOCUMENTS

| | | | |
|---|---|---|---|
| 5,206,310 A | 4/1993 | Yasue et al. | |
| 2007/0203282 A1* | 8/2007 | Bradley et al. | ........... 524/439 |
| 2008/0119603 A1 | 5/2008 | Topoulos | |

FOREIGN PATENT DOCUMENTS

| | | |
|---|---|---|
| EP | 0957131 A2 | 11/1999 |
| EP | 1245640 A1 | 10/2002 |
| WO | 02/40591 A1 | 3/2002 |

* cited by examiner

*Primary Examiner* — Tae H Yoon

(74) *Attorney, Agent, or Firm* — Browdy and Neimark, PLLC

(57) ABSTRACT

Filled polyamide molding materials, in particular polyamide molding materials with medium filler content, are producible from a polyamide blend and for example by compounding with chopped or endless fibers on two-screw extruders, and have a combination of reduced water absorption and good mechanical properties, which results in very good dimensional stability and reduced variation of the electrical properties of the produced molded part, such as an antenna housings of stationary or mobile communication devices. These thermoplastic polyamide molding materials are suitable for manufacturing molded parts and other semi-finished or finished parts, for example by extrusion, injection molding, pressing, direct process or direct compounding, respectively, wherein the compounded polyamide molding material is directly processed by injection molding or other shaping methods.

21 Claims, No Drawings

FILLED POLYAMIDE MOLDING MATERIALS SHOWING A REDUCED WATER ABSORPTION

CROSS-REFERENCE TO RELATED APPLICATIONS

The present application is a division of application Ser. No. 12/027,581, filed Feb. 7, 2008 which claims priority from EP07002642.2, filed Feb. 7, 2007. The entire content of both applications are herein incorporated by reference.

The present invention relates to filled polyamide molding materials, in particular polyamide molding materials with medium filler content, which are producible from a polyamide blend and for example by compounding with chopped or endless fibers on twin-screw extruders, and showing a combination of reduced water absorption and good mechanical properties, which results in very good dimensional stability and reduced variation of the electrical properties of the produced molded part such as antenna housings of stationary or mobile communication devices.

The thermoplastic polyamide molding materials according to the present invention are suitable for manufacturing molded parts and other semi-finished or finished parts, which are producible for example by extrusion, injection molding, pressing, direct process or direct compounding, respectively, wherein the compounded polyamide molding material is directly processed by injection molding or other shaping methods.

Finally, the present invention relates to the use of filled polyamide molding materials for manufacturing antenna housings for stationary or mobile communications devices. These molded parts have a significantly reduced variation of the electrical properties, i.e. the transmission or reception performance varies slightly with variable ambient humidity.

Filled polyamide blends play an increasing role in the field of technical construction materials, because they have good mechanical properties. Fields of application are, for example, internal and external parts in the automotive sector and in the field of other means of transport, housing material for appliances and equipment for telecommunications, consumer electronics, household appliances, mechanical engineering, heating systems and mounting parts for installations.

The particular advantage of filled polyamides is the exceptionally good bonding between polymer matrix and fillers, especially concerning reinforcing fibrous fillers. However, due to high water absorption, the dimensional stability of molded parts produced thereof does not meet all requirements.

In the following, such polymers are to be understood as polyamides in the present application, which have basic building blocks that are held together by amide bonds (—NH—CO—) and which are producible by polycondensation or polymerization of monomers, such as dicarboxylic acids, dicarboxylic acid halides, diamines, aminocarboxylic acids and/or lactames. They may be homopolymers or copolyamides. The average molecular weight of the polyamides should be more than 5,000, preferably more than 10,000.

EP 0 441 423 B1 describes polyamide resin compositions with good mechanical properties and relatively low values of water absorption containing necessarily polyamide 46, and an aliphatic polyamide with a ratio of $CH_2$/NHCO groups of 6 to 11 in the polyamide backbone and an amorphous polyamide with a Tg of more than 100° C. and optionally fillers. The values for water absorption indicated in EP 0 441 423 B1 do not yet show the equilibrium value, since it was only stored 24 h, however the lowest value is about 2.6%.

EP 0 728 812 A1 describes thermoplastic molding materials from partly aromatic and amorphous copolyamides which optionally contain fibrous and other particulate fillers and rubber-elastic polymers. These molding materials shall have improved mechanical properties and shall be suitable for long-term usage at high temperatures, and shall also have good solution and oil resistance. EP 0 728 812 A1 does not use aliphatic polyamides as basic polyamide A), but partly aromatic copolyamides which necessarily comprise terephthalic acid, isophthalic acid, hexamethylene diamine and a cycloaliphatic diamine. Concerning water absorption of the molding materials, no information is given.

EP 0 400 428 A1 describes thermoplastic molding materials from partly aromatic copolyamides, optionally aliphatic polyamides with adipic acid as monomer and optionally caprolactam. The thermoplastic molding materials according to EP 0 400 428 A1 shall have a good overall spectrum of mechanical properties, in particular high toughness levels. EP 0 400 428 A1 does not use aliphatic polyamides as basic polyamide A), but partly aromatic copolyamides which necessarily comprise 6T units and caprolactam and/or 66 units. Concerning water absorption of the molding materials, no information is given.

Therefore, it is the object of the present invention, to provide polyamide molding materials with low water absorption and good mechanical properties, resulting in very good dimensional stability and significantly reduced variation of the electrical properties of the manufactured molded parts.

This object is achieved by the polyamide molding materials according to claim 1, with a polyamide matrix of a blend of polyamide 613 and/or polyamide 614 and/or polyamide 615 and/or polyamide 616 and/or polyamide 617 and/or polyamide 618 (A) and a copolyamide 6I/6T or polyamide 6I (B), respectively, and at least one fibrous or particulate filler (C), selected from the group consisting of glass fibers, carbon fibers, metal fibers, aramid fibers, whiskers, talc, mica, silicates, quartz, titanium dioxide, wollastonite, kaolin, silicic acids, magnesium carbonate, magnesium hydroxide, chalk, grounded or precipitated calcium carbonate, lime, feldspar, barium sulfate, permanent magnetic or magnetizable metals or alloys, glass balls, hollow glass balls, hollow spheroidal silicate fillers, natural layered silicates, synthetic layered silicates and mixtures thereof.

Due to the low water absorption, the molded parts made from polyamide molding materials according to the present invention have very good dimensional stability and decreased variation in the electrical properties compared to molding materials based on polyamide 6 or polyamide 66.

Therefore, the present invention relates to filled polyamide molding materials with low water absorption and good mechanical properties based on polyamide 613, polyamide 614, polyamide 615, polyamide 616, polyamide 617, polyamide 618, of a blend, consisting essentially of the following components:

(A) at least one aliphatic polyamide from the group consisting of polyamide 613, polyamide 614, polyamide 615, polyamide 616, polyamide 617, polyamide 618, or mixtures thereof, (B) polyamide, build up from
  ($b_1$) 60 to 100 wt.-parts units, preferably 60 to 80 wt.-parts units, more preferably 67 wt.-parts units, derived from isophthalic acid (I) in combination with hexamethylene diamine (6) in almost equimolar ratio,
  ($b_2$) 0 to 40 wt-parts units, preferably 20 to 40 wt-parts units, more preferably 33 wt.-parts units, derived from terephthalic acid (T) in combination with hexamethylene diamine (6) in almost equimolar ratio,
wherein the wt.-parts of the components ($b_1$) and ($b_2$) totals 100 wt.-parts, and at least one filler component (C):
(C) selected from the group consisting of glass fibers, carbon fibers, metal fibers, aramid fibers, whiskers, talc, mica, silicates, quartz, titanium dioxide, wollastonite, kaolin, silicic acids, magnesium carbonate, magnesium hydroxide, chalk, grounded or precipitated calcium carbonate, lime, feldspar, barium sulfate, permanent magnetic or magnetizable metals or alloys, glass balls, hollow glass balls, hollow spheroidal silicate fillers, natural layered silicates, synthetic layered silicates and mixtures thereof,
wherein the weight percents of the components (A) to (C) totals 100%, and
wherein the components (A), (B) and (C) fulfill the following conditions:
(A)+(B): 80 to 20 wt.-%,
weight ratio (A)/(B): 60/40 to 90/10, preferably 70/30 to 85/15, more preferably 70/30 to 80/20, most preferably 75/25,
(C): 20 to 80 wt.-%, preferably 21 to 70 wt-. %, more preferably 31 to 64 wt.-%,
wherein the polyamide molding materials optionally comprise usual additives (D) in addition to the components (A) to (C), and wherein their amount is in addition to the sum of the components (A) to (C).

Furthermore, the present invention relates to a method for manufacturing polyamide molding materials on normal compounding machines at cylinder temperatures of 260° C. to 320° C., wherein the polymeric portion is melted first and then fillers are dosed.

The molding materials according to the present invention can be used to manufacture molded parts, preferably injection molded parts, more preferably for manufacturing antenna housings of stationary and mobile communication devices. These molded parts have inter alia good dimensional stability, small change in permittivity ($\epsilon_r$) and loss angle (tan δ), and good hydrolytic stability due to low water absorption.

In the dependent claims more favorable embodiments of the present invention are contained.

Needle-like single crystals of metals, oxides, borides, carbides, nitrides, polytitanate, carbon etc. mostly with polygonal cross-section are regarded to be whiskers, e.g. potassium titanate whiskers, aluminum oxide whiskers, silicon carbide whiskers. Whiskers generally have a diameter of 0.1 to 10 μm and a length in the range of mm to cm. Additionally, they have a high tensile strength. Whiskers can be produced by deposition from the gas phase on solids (VS mechanism), or from a three-phase system (VLS-mechanism).

The glass fibers have a diameter of 5 to 20 preferably of 5 to 15 μm and more preferably of 5 to 10 μm. The glass fibers preferably have circular, oval, elliptical or rectangular cross section.

Preferably, glass fibers, especially oval, elliptical or rectangular with non-circular cross section ("flat glass fibers") may be used in molding materials according to the present invention. These molding materials have advantages concerning strength and toughness, especially in the transverse direction, in the molded parts manufactured from the molding materials.

Preferably, the glass fibers are consisting of E glass. The glass fibers may be added as endless fibers or as chopped glass fibers, wherein the fibers may be equipped with a suitable sizing system and an adhesive agent or an adhesive agent system, e.g. based on silane.

For example, carbon black and/or carbon nanotubes may be used as antistatics in the molding materials according to the present invention.

Using carbon black may also improve the black coloring of the molding material.

Kaolins, serpentine, talc, mica, vermiculite, illite, smectite, montmorillonite, hectorite, double hydroxides or mixtures thereof may be used as layered silicates in the molding materials according to the present invention. The layered silicates may be surface treated or untreated.

Antioxidants, antiozonants, light stabilizers, UV stabilizers, UV absorbers or UV blockers may be used in the molding materials according to the present invention as stabilizers and anti-aging agents, respectively.

The aliphatic polyamide A) has a relative viscosity between 1.4 and 2.5, preferably 1.5 and 2.1 (0.5 wt.-% solution in m-cresol, 20° C.).

Polyamide 614 or polyamide 618 or their mixture is preferably used as aliphatic polyamide A), more preferably polyamide 614 is used.

An even greater toughness can be achieved by using special thin glass fibers with a diameter below 10 μm.

The preparation of the polyamide molding materials according to the present invention can be effected on customary compounding machines, such as, for example, single-screw or twin-screw extruders or screw kneaders. As a rule, the polymeric fraction is first melted and the filler can be introduced at a subsequent point of the extruder, for example, by means of a side feeder. If more than one filler is used, it may be added at the same point or at various points of the extruder. The compounding is preferably effected at set barrel temperatures of 260° C. to 320° C. However, the polymer portion and the fillers may also be dosed into the feeder together.

The polyamide molding materials according to the present invention may also be manufactured by the known methods for producing long-fiber reinforced rod-like granules, particularly by using a pulltrusion method, wherein the endless fiber strand (roving) is completely soaked with the polymer melt, and subsequently cooled and cut. The long-fiber reinforced rod-like granules obtained thereby can be processed to molded parts using the normal processing procedures; especially good properties of the molded part can be obtained using gentle processing methods.

The glass fibers, which are used as roving in an alternative according to the present invention have a diameter of 10 to 20 μm, preferably of 12 to 18 μm, wherein the cross-section of the glass fibers is circular, oval, elliptical or angular.

According to the present invention, E glass fibers are especially used as chopped glass fibers, or as endless fibers (roving). However, all other glass fiber types, such as A, C, D, M, S, R glass fibers or any mixtures thereof or mixtures with E glass fibers may be used.

The polymer strand made from molding materials according to the present invention may be processed to granules by all known granuling methods, such as strand granuling, wherein the strand is cooled in a water bath and subsequently cut. At a filler content of more than 60 wt.-% underwater granuling and underwater hot cut off, respectively, should be used to improve the quality of the granules, wherein the polymer melt is directly pressed through a nozzle hole and granuled by a rotating knife in a water stream.

The molding materials according to the present invention can be processed at cylinder temperatures of 260° C. to 320°

C., wherein form temperatures of 60° C. to 130° C. have to be chosen depending on the filler content of the molding materials.

Another alternative for producing molding materials according to the present invention is mixing of granules with e.g. different matrices and/or fillers to form a dryblend, which will then be processed further. For example, starting from the components (A) and/or (B) and the fillers (C), and optionally the additive (D), respectively, a compound may be produced in granular form and these granules may then be mixed to form a dryblend, optionally adding additional quantities of granular component (A) and/or (B). The such produced dryblend will then be processed.

The homogenized granular mixture (dryblend) is processed in a processing machine, for example a screw injection molding machine, to reinforce molded parts and/or hollow bodies, wherein further quantities of granules of component (A) and/or (B) may be added.

Processing of a dryblend tends to result in better mechanical properties. However, mixing of the dryblends generates an additional manufacturing step, which increases the cost of the product and thus lowers the economic efficiency. Moreover, vibration during transport may result in demixing, due to density differences and/or size differences of the various types of granules.

The molded parts made from the molding materials according to the present invention are used for producing interior and exterior parts, preferably with large requirements for dimensional accuracy, preferably in an environment with varying humidity, for example, in the fields of electrics, furniture, sports, engineering, sanitation and hygiene, medicine, energy and propulsion technology, automobiles and other means of transportation or housing materials for equipment and devices for telecommunication, in particular antenna housings for mobile or stationary communication devices, consumer electronics, household appliances, machinery, heating, or fastening parts for installations or for containers and ventilation parts of all kinds.

A preferred use of the molding materials according to the present invention is the production of antenna housings for mobile or stationary communication devices. Due to the significantly reduced water absorption, the molded part and/or the housing has a significantly reduced variation of electrical properties. As described above, the electrical properties comprise, for example, permeability of electromagnetic radiation, permittivity ($\epsilon_r$), or loss angle (tan $\delta$). The water absorption results in a weakened signal due to increasing the permittivity.

The following examples illustrate the present invention without limiting it.

EXAMPLES

The materials used in the examples and comparative examples are characterized in table 1.

TABLE 1

| material | commercial name | relative viscosity m-cresol, 0.5 wt.-% at 20° C. | composition weight-ratio | manufacturer |
|---|---|---|---|---|
| PA 614 | — | 1.93 | — | EMS-CHEMIE AG, Switzerland |
| PA6I/6T | GRIVORY G21 | 1.52 | 2/1 | EMS-CHEMIE AG, Switzerland |
| glass fiber | Vetrotex EC10-4, 5MM 99B | — | — | Saint-Gobain Vetrotex, France |
| carbon fiber | Tenax HTA 5N51 6MM | — | — | Toho Tenax Europe GmbH, Germany |
| potassium carbonate | Millicarb-OG | — | — | Plüss-Staufer AG, Switzerland |
| PA 66 | Radipol A45 | 2.7 in $H_2SO_4$, 1 wt.-% | — | Radici Chimica, Italy |
| PA 6 | GRILON A28 | 2.75 in $H_2SO_4$, 1 wt.-% | — | EMS-CHEMIE AG, Switzerland |

The molding materials of the compositions in Table 2 and 3 are prepared on a twin-screw extruder from the firm Werner & Pfleiderer type ZSK25. The granules PA 614 and PA 6I/6T are metered into the feed zone. The glass fiber as well as the carbon fiber is dosed into the polymer melt via a side feeder 3 barrel units before the die.

The barrel temperature has been set as an ascending temperature profile up to 310° C. At 150 to 200 rpm, 10 kg throughput has been used. After cooling of the strands in a water bath the granular properties were measured after granulation and drying at 120° C. for 24 h.

The test specimens have been produced on an Arburg injection molding machine, wherein the cylinder temperatures were set with ascending profile of 280° C. to 310° C. and the molding temperature was chosen as 100° C.

The measurements were performed according to the following standards and at the following test specimens.

Tensile modulus of elasticity:
ISO 527 with a traction speed of 1 mm/min
ISO tensile bar, standard: ISO/CD 3167, type A1, 170×20/10×4 mm, temperature 23° C.
Breaking strength and elongation at break:
ISO 527 with a speed of 5 mm/min
ISO tensile bar, standard: ISO/CD 3167, type A1, 170×20/10×4 mm, temperature 23° C.
Relative Viscosity:
ISO 307
0.5 wt-% m-cresol solution
temperature 20° C.
Calculation of the relative viscosity (RV) according to RV=t/$t_0$ based on section 11 of the norm.
Water absorption:
ISO 62
granules
temperature 23° C.
At 50% relative humidity or at 100% relative humidity, respectively, the granules are stored until weight stops increasing.
If the specimens are used in the dry state, they are stored at least 48 h at room temperature in a dry environment after injection molding, i.e. stored over silica gel.
Conditioned specimens are stored according to ISO 1110 for 14 days at 72° C. and 62% relative humidity.

The water absorption of GRIVORY G21 (PA 6I/6T; 2/1) is 2 wt.-% (at 23° C. and 50% relative humidity) and 7 wt.-% (at 23° C. and 100% relative humidity), respectively.

TABLE 2

|  | conditions | unit | examples number | | | |
|---|---|---|---|---|---|---|
|  |  |  | 1 | 2 | 3 | 4 |
| PA 614 | — | wt.-% | 52.5 | 37.5 | 22.5 | 45 |
| PA 6I/6T | — | wt.-% | 17.5 | 12.5 | 7.5 | 15 |
| glass fiber | — | wt.-% | 30 | 50 | 62 | 30 |
| carbon fiber | — | wt.-% | — | — | 8 | — |
| potassium carbonate | — | wt.-% | — | — | — | 10 |
| Tests |  |  |  |  |  |  |
| tensile modulus | dry | MPa | 8000 | 14800 | 26500 | 8400 |
| of elasticity | conditioned | MPa | 7800 | 13600 | 25000 | 8300 |
| tensile strength at | dry | MPa | 150 | 205 | 200 | 160 |
| break | conditioned | MPa | 130 | 180 | 180 | 135 |
| elongation at break | dry | % | 5 | 4 | 1.7 | 4.3 |
|  | conditioned | % | 6 | 4.5 | 1.9 | 5 |
| water absorption | 23° C., 50% r.h. | wt.-% | 0.6 | 0.5 | 0.4 | 0.5 |
|  | 23° C., 300% r.h. | wt.-% | 2.0 | 1.6 | 1.3 | 1.8 |

TABLE 3

|  | condition | unit | comparative examples number | | | |
|---|---|---|---|---|---|---|
|  |  |  | 5 | 6 | 7 | 8 |
| PA 66 | — | wt.-% | 52.5 | 37.5 | — | — |
| PA 6I/6T | — | wt.-% | 17.5 | 12.5 | — | — |
| PA 12 | — | wt.-% | — | — | — | — |
| PA 6 | — | wt.-% | — | — | 50 | 60 |
| glass fiber | — | wt.-% | 30 | 50 | 50 | 30 |
| mineral | — | wt.-% | — | — | — | 10 |
| tests |  |  |  |  |  |  |
| tensile modulus of | dry | MPa | 9500 | 16500 | 15400 | 10000 |
| elasticity | conditioned | MPa | 8500 | 15500 | 10600 | 6500 |
| tensile strength at | dry | MPa | 170 | 235 | 230 | 190 |
| break | conditioned | MPa | 155 | 210 | 150 | 130 |
| elongation at break | dry | % | 3 | 2 | 3 | 4 |
|  | conditioned | % | 3 | 2 | 5 | — |
| water absorption | 23° C., 50% r.h. | % | 1.5 | 1.4 | 1.5 | 2 |
|  | 23° C., 100% r.h. | % | 5 | 4 | 5 | 7 |

As shown by the comparisons of example 1 and comparative example 5 and example 2 and comparative example 6, the water absorption of molding materials according to the present invention is significantly lower than that of the corresponding comparative examples.

The molding material according to the example 4 of the present invention shows greatly reduced water absorption in comparison to the molding material of comparison example 8.

The molding materials according to the present invention show a smaller decrease of tensile modulus of elasticity by conditioning.

Furthermore, they show a higher elongation at break with the appropriate filler content.

The invention claimed is:

1. Filled polyamide molding material with low water absorption and good mechanical properties, consisting essentially of the following components:

(A) one aliphatic polyamide being polyamide 618, (B) a copolyamide built up from ($b_1$) 60 to 80 wt.-parts units, derived from isophtalic acid (1) in combination with hexamethylene diamine (6) in almost equimolar ratio, and ($b_2$) 20 to 40 wt.-parts units, derived from terephthalic acid (T) in combination with hexamethylene diamine (6) in almost equimolar ratio, wherein the wt.-parts of the components ($b_1$) and ($b_2$) totals 100 wt.-parts, and (C) at least one filler component selected from the group consisting of glass fibers, carbon fibers, metal fibers, aramid fibers, whiskers, talc, mica, silicates, quartz, titanium dioxide, wollastonite, kaolin, silicic acids, magnesium carbonate, magnesium hydroxide, chalk, grounded or precipitated calcium carbonate, lime, feldspar, barium sulfate, permanent magnetic or magnetizable metals or alloys, glass balls, hollow glass balls, hollow spheroidal silicate fillers, natural layered silicates, synthetic layered silicates and mixtures thereof, wherein the weight percents of the components (A) to (C) total 100%, and wherein the components (A), (B) and (C) fulfill the following conditions:

(A)+(B): 80 to 20 wt.-%, weight ratio (A)/(B): 60/40 to 90/10, (C): 20 to 80 wt.-%, wherein the polyamide molding material optionally comprises usual additives (D) in addition to the components (A) to (C), and wherein their amount is in addition to the sum of the components (A) to (C).

2. Polyamide molding material according to claim 1, wherein the aliphatic polyamide has a solution viscosity, measured in m-cresol (0.5 wt.-% at 20° C.) of ηrel between 1.4 and 2.5.

3. Polyamide molding material according to claim 1, having a water absorption (23° C., 50% relative humidity) of <1% and of <2.8%, respectively (23° C., 100% relative humidity).

4. Polyamide molding material according to claim 1, wherein the molding material has an elongation at break of 3.5% or more (measured according to ISO 527) at a glass fiber content of at least 30 wt.-%.

5. Polyamide molding material according to claim 1, wherein additives (D) are contained in the molding materials, which are selected from the group consisting of the inorganic stabilizers, organic stabilizers, lubricants, dyes, metallic pigments, metal spangle, metal coated particles, halogenated flame retardants, halogen-free flame retardants, impact modifiers, antistatics, conductivity additives, demolding agents, optical brighteners, and mixtures of the above additives.

6. Polyamide molding material according to claim 1, wherein glass fibers with a diameter of 5 to 20 μm are used as filler component (C), wherein the cross-section of the glass fibers is circular, oval, elliptical or angular.

7. Method for producing polyamide molding material according to claim 1, on conventional compounding machines at cylinder temperatures of 260° C. to 320° C., wherein the polymeric portion is melted first and then the fillers are dosed.

8. Method for producing polyamide molding material according to claim 1, comprising, firstly, making a compound in granular form from the first components (A) and (B) and the fillers (C) and optionally the additives (D), respectively, and subsequently mixing these granules and optionally adding additional granular quantities of the components (A) and optionally (B), and then processing the granules.

9. Method of using the molding material according to claim 1 with water absorptions below 1% (23° C., 50% relative humidity) and below 2.8% (23° C., 100% relative humidity), respectively, for producing molded parts.

10. Method for producing molded patios from the polyamide molding material according to claim 1 by injection molding, extrusion, blow molding, direct compounding or other shaping methods.

11. Molded part, obtained from the polyamide molding material according to claim 1.

12. Molded part according to claim 11, wherein it is an antenna housing for stationary or mobile communications devices.

13. Polyamide molding material according to claim 1 wherein component ($b_1$) comprises 67 wt.-parts derived from isophtalic acid (I).

14. Polyamide molding material according to claim 1, wherein the weight ratio (A)/(B) is 70/30 to 85/15, and the wt.-% of component (C) is 21-70 wt.-%.

15. Polyamide molding material according to claim 14, wherein the weight ratio of (A)/(B) is 70/30 to 80/20 and the percent of component (C) is 31-64 wt.-%.

16. Polyamide molding material according to claim 15, wherein the weight ratio of (A)/(B) is 75/25, and the quantity of component (C) is 31-64 wt.-%.

17. Polyamide molding material according to claim 6 wherein the glass fibers are E glass fibers.

18. Polyamide molding material according to claim 2, wherein the aliphatic polyamide has a solution viscosity, measured in m-cresol (0.5 wt.-% at 20° C.) of ηrel between 1.5 and 2.1.

19. Polyamide molding material according to claim 5, wherein said additive (D) comprises a conductivity additive selected from the group consisting of carbon black, carbon nanotubes, and mixtures thereof.

20. A method of using molded material, in accordance with claim 9, for producing injection molded parts.

21. A method of using molded material, in accordance with claim 9, for producing antenna housings for stationary or mobile communication devices.

* * * * *